United States Patent
Earl et al.

(10) Patent No.: US 9,862,402 B2
(45) Date of Patent: Jan. 9, 2018

(54) VEHICLE COMPRISING COLLISION CONTROL SYSTEM, COLLISION CONTROL SYSTEM AND METHOD

(71) Applicant: NINGBO GEELY AUTOMOBILE RESEARCH & DEVELOPMENT CO. LTD., Ningbo (CN)

(72) Inventors: Tony Earl, Göteborg (SE); Urban Wendt, Uddevalla (SE)

(73) Assignee: Ningbo Geely Automobile Research & Development Co., Ltd., Ningbo (CN)

( * ) Notice: Subject to any disclaimer, the term of this patent is extended or adjusted under 35 U.S.C. 154(b) by 0 days.

(21) Appl. No.: 15/250,206

(22) Filed: Aug. 29, 2016

(65) Prior Publication Data
US 2016/0368520 A1 Dec. 22, 2016

Related U.S. Application Data

(63) Continuation of application No. PCT/EP2016/059997, filed on May 4, 2016.

(30) Foreign Application Priority Data

May 7, 2015 (SE) .................................. 1550581-1

(51) Int. Cl.
B62D 25/14 (2006.01)
B62D 1/11 (2006.01)
B60R 13/02 (2006.01)

(52) U.S. Cl.
CPC ............ *B62D 1/11* (2013.01); *B60R 13/0256* (2013.01); *B62D 25/14* (2013.01); *B62D 25/145* (2013.01); *B60K 2350/941* (2013.01)

(58) Field of Classification Search
CPC .. B60K 2350/943; B60K 37/00; B62D 25/14; B62D 25/145; B62D 1/19; B62D 1/195
(Continued)

(56) References Cited

U.S. PATENT DOCUMENTS 5,067,747 A * 11/1991 Yokoyama ............. B62D 1/195
280/777
5,280,956 A * 1/1994 Tanaka .................... B62D 1/195
280/777
(Continued)

FOREIGN PATENT DOCUMENTS

CN 101402320 A 4/2009
CN 103253294 A 8/2013
(Continued)

OTHER PUBLICATIONS

Definition of "beam" from dictionary.com http://www.dictionary.com/browse/beam accessed Mar. 13, 2017.*
(Continued)

*Primary Examiner* — Hilary Gutman
(74) *Attorney, Agent, or Firm* — Lee & Hayes, PLLC

(57) ABSTRACT

Collision control system (40) for controlling deflection of an instrument cluster (30) in a vehicle during collision. Said collision control system (40) comprises a steering assembly (10) including a steering wheel (12) and a steering column (11), a cross car beam (20) comprising a first sliding surface (22), and an instrument panel assembly (35) including an instrument cluster (30) and a second sliding surface (32), which is arranged to abut and slide along said first sliding surface (22) during said collision. During collision said steering column (11) is configured to move forward in a controlled manner and said steering column assembly (10) is arranged to push said instrument cluster (30), such that said second sliding surface (32) of said instrument panel assembly (35) slides along the first surface (22) for controlled deflection of the instrument cluster (30).

19 Claims, 5 Drawing Sheets

(58) Field of Classification Search
USPC .................................................. 296/187.09
See application file for complete search history.

(56) References Cited

U.S. PATENT DOCUMENTS

| | | | | |
|---|---|---|---|---|
| 5,503,431 | A * | 4/1996 | Yamamoto | B62D 1/184 188/376 |
| 5,588,332 | A * | 12/1996 | Hedderly | B62D 1/195 188/371 |
| 5,609,063 | A * | 3/1997 | Hedderly | B62D 1/195 188/371 |
| 6,149,196 | A | 11/2000 | Guiard et al. | |
| 6,170,874 | B1 * | 1/2001 | Fosse | B62D 1/195 180/268 |
| 7,669,500 | B2 * | 3/2010 | Matsui | F16F 7/123 280/775 |
| 8,596,712 | B2 * | 12/2013 | Miller | B62D 21/15 296/187.03 |
| 2006/0043722 | A1 * | 3/2006 | Hoshino | B62D 1/195 280/777 |
| 2006/0186658 | A1 * | 8/2006 | Yasuhara | B62D 1/184 280/775 |
| 2009/0085338 | A1 * | 4/2009 | Tanaka | B60K 37/00 280/777 |

FOREIGN PATENT DOCUMENTS

| | | | | |
|---|---|---|---|---|
| JP | | 7246858 A | 9/1995 | |
| JP | | 2005297795 A | 10/2005 | |
| SE | WO | 0017035 A1 * | 3/2000 | ............. B60K 37/00 |

OTHER PUBLICATIONS

International Search Report for PCT/EP/2016/059997, dated Jul. 21, 2016, 4 pages.
Chinese Office Action dated Oct. 26, 2017 for Chinese patent application No. 201680001652.4, a counterpart foreign application of U.S. Appl. No. 15/250,206, 16 pages.

* cited by examiner

VEHICLE COMPRISING COLLISION CONTROL SYSTEM, COLLISION CONTROL SYSTEM AND METHOD

RELATED APPLICATION

This application is a continuation of PCT International Application No. PCT/EP2016/059997, filed May 4, 2016, which claims foreign priority to Sweden Application No. SE 1550581-1, filed on May 7, 2015, both of which are incorporated herein by reference.

TECHNICAL FIELD

Example embodiments presented herein are directed towards a collision control system for controlling deflection of an instrument cluster in a vehicle during collision. Example embodiments are also directed towards a vehicle comprising such a collision control system as well as corresponding methods for controlling deflection of an instrument cluster in a vehicle during collision.

BACKGROUND ART

Passenger safety is one of the major concerns with designing a modern vehicle such as e.g. passenger cars. The forces placed on occupants of a vehicle during a collision event may be large enough to lead to serious or fatal injury. Modern vehicles are often equipped with an airbag on the driver's side, which deploys during serious collisions. Most vehicles have this airbag located in a compartment near the centre of the steering wheel.

In some modern vehicles, the steering column will also move forward in a controlled manner, i.e. displacing the steering wheel in the forward direction of the vehicle during a collision event. This will accomplish, among other things, a reduction of force on the driver, both in cases where the airbag deploys as normal, supplementing the airbag.

An issue with the displacement of the steering column is that it may impact the instrument cluster during its displacement, the collection of meters and other indicators most often located above the steering column in the dashboard. This may reduce the benefit during collision as the instrument cluster may hinder forward movement of the steering column (which may lead to the force reduction on the driver not being sufficiently low). Additionally, the force may damage or shatter the instrument cluster, leading to costly repairs and/or debris from the cluster being scattered inside the vehicle posing additional risk to the occupants.

US 2009/0085338 A1 discusses a vehicle instrument panel structure ensuring a frontward displacement of the steering column during collision. The instrument panel structure is arranged to detach the instrument cluster when a steering column cover contacts the cluster, and push the meter unit upwardly. This allows the steering mechanism to be displaced towards the front of the vehicle.

WO 00/17035 A1 discloses a dashboard arrangement with a steering mechanism which is adapted to be displaced towards the dashboard. A section of the dashboard is connected to a pyrotechnic removal member, which is arranged to pull the section away from the steering wheel along guides during collision.

While the solutions found in the prior art work well in some situations, there is still room in the vehicle field for an improved collision control solution.

SUMMARY OF THE INVENTION

An object of this disclosure is to provide a collision control system for controlling deflection of an instrument cluster in a vehicle during collision. Another object of this disclosure is to provide a vehicle comprising such a collision control system. A further object of this disclosure is to provide a method for controlling deflection of an instrument cluster in a vehicle during collision.

An object of the disclosure is achieved by a collision control system as described herein. In a collision control system for controlling deflection of an instrument cluster in a vehicle during collision, said collision control system comprises a steering assembly including a steering wheel and a steering column, a cross car beam comprising a first sliding surface, and an instrument panel assembly including an instrument cluster and a second sliding surface, which is arranged to abut and slide along said first sliding surface during said collision. During collision, said steering column is configured to move forward in a controlled manner and said steering assembly is arranged to push said instrument cluster, such that said second sliding surface of said instrument panel assembly slides along the first surface for controlled deflection of the instrument cluster.

An example advantage of the collision control system is that the instrument cluster is deflected in a predictable and safe manner. This allows for the steering assembly, and in particular the steering column, to more reliably and controllably absorb a well-defined and well-distributed amount of force during vehicle collision. This may for example occur during a relatively severe collision or as part of a secondary collision after a first collision in which the airbag has already been deployed.

The deflection of the instrument cluster is further enabled by using the cross car beam as rigid support for the deflection motion of the instrument cluster. The already existing cross car beam may thus have dual functionality by providing support to the instrument panel and steering assembly, as well as providing support for the deflection motion. Thereby, no additional component is required for providing the necessary deflection support.

According to some of the example embodiments, the instrument cluster comprises said second sliding surface. In another example embodiment, the instrument panel assembly comprises an instrument panel substrate that comprises the second sliding surface. Thereby, the instrument cluster may slide directly on a surface of the cross car beam, or the instrument cluster may be arranged inside or on the instrument panel substrate which will slide on the surface of the cross car beam.

According to some of the example embodiments, said first sliding surface of said cross car beam is located on a cross car beam attachment located on said cross car beam. This allows the dimensions of the first sliding surface to be chosen independently of the shape and size of the cross car beam.

According to some of the example embodiments, the instrument panel assembly comprises an instrument panel substrate that comprises the first sliding surface, and the instrument cluster comprises said second sliding surface. This allows the instrument cluster to slide inside the instrument panel substrate when arranged therein, while the instrument panel substrate is being supported by the cross car beam. Thereby the cross car beam also supports the first sliding surface.

According to some of the example embodiments, the instrument cluster comprises said second sliding surface. The instrument cluster may thus be configured to directly contact the first sliding surface. The second sliding surface may be located at the rear and/or bottom portion of the instrument cluster. The second sliding surface may be formed integrally with a housing of the instrument cluster or alternatively be located on a separate part that is permanently attached to the instrument cluster, such as specially designed sliding part made of plastic and/or metal material.

According to some of the example embodiments, the instrument panel assembly comprises an instrument panel substrate, and said instrument panel substrate comprises said second sliding surface. In this arrangement, the instrument cluster during collision consequently pushes the instrument panel substrate, which slides along the first sliding surface. The portion of the instrument panel substrate holding the instrument cluster is in such configuration preferably relatively flexible for allowing sufficient deflection of the instrument cluster without inducing any significant counterforce.

According to some of the example embodiments, the instrument cluster is arranged partially enclosed by a compartment of the instrument panel assembly, and a part of said compartment is arranged to flex when said instrument cluster is displaced during said collision. This provides additional room for the instrument cluster to be displaced, which may otherwise have been prevented by the interior of the dashboard. The primarily relevant direction of flex is along the direction of the sliding surface, i.e. a direction towards the front and upwards of the vehicle.

According to some of the example embodiments, an extension direction of the first sliding surface defines an angle relative to a direction of axial extension of the steering column. Said angle is in the range of 10-80° degrees, specifically in the range of 20-60° degrees, and more specifically in the range of 30-55° degrees. This angle, which depends on the dashboard dimensions, is necessary to ensure that the instrument cluster is deflected in a correct direction. If the angle is too high, the forces pressing on the instrument cluster would not move it out of the way, and instead impact it. If the angle is too low, the distance which it would be necessary to push it out of the way is too low.

According to some of the example embodiments, said steering assembly comprises a steering assembly attachment arranged at said steering column, wherein said steering assembly attachment comprises a bearing surface, and wherein said steering assembly is arranged to push said instrument cluster by said bearing surface, and where an extension direction of said bearing surface defines an angle relative to a direction of axial extension of the steering column, and wherein said angle is in the range of 10-80° degrees, specifically in the range of 30-75° degrees, and more specifically in the range of 45-70° degrees. This angled surface contributes to improving the ability of the collision control system to push the instrument cluster away from the path of the steering assembly.

According to some of the example embodiments, at least one of the first and second sliding surfaces is equipped with at least one groove along at least part of the extension of the first or second sliding surface, which at least one groove extends in an intended sliding direction of said second sliding surface along said first sliding surface. This allows the contact surface area to be tuned to achieve the preferred friction between the first and second sliding surfaces. Thus, the friction values may be achieved with many different materials and can be easily integrated with regards to existing components.

According to some of the example embodiments, the first and second sliding surfaces are configured for deflecting the instrument cluster in a direction towards a point above the cross car beam. Depending on the dimensions of the interior of the dashboard, this allows the instrument cluster to be pushed in a direction without impacting or being hindered by the cross car beam.

According to some of the example embodiments, the first sliding surface is substantially flat. This provides a linear path of deflection for the instrument cluster.

According to some of the example embodiments, the collision control system is configured such that the force needed to displace said instrument cluster 50 mm along said first sliding surface is below 500 N, more preferably below 300 N. The force needed to deflect to the instrument cluster is preferable relatively low compared to the forces absorbed by the steering column during the move forward in a controlled manner thereof, for the purpose of not negatively affecting the calculated and controlled forward motion of the steering wheel during a vehicle collision. In principle, the force needed to deflect to the instrument cluster is preferably very low, such as for example, about less than ⅕ of the force required for moving the steering column forward in a controlled manner. This allows deflection and energy absorption to be more or less entirely controlled by the steering column.

According to some of the example embodiments, at least one of the first or second sliding surfaces comprises two transversally spaced sliding surface parts. These sliding surface parts could be placed e.g. at either side of the steering column, which may e.g. allow for fitting of other components between these sliding surface parts.

According to some of the example embodiments, the first and second sliding surfaces are arranged to abut during normal operation of the vehicle. This means that the instrument cluster does not first need to be pushed into abutting the first sliding surface at the second sliding surface, but can instead be pushed out of the way of the steering column right away when said steering column is moving forward.

A further object of the disclosure is achieved by a vehicle as described herein. An example embodiment of the vehicle comprises a collision control system according to the disclosure.

A further yet object of the disclosure is achieved by a method as described herein.

According to some of the example embodiments of the method for controlling deflection of an instrument cluster in a vehicle during collision, said vehicle comprises a steering assembly including a steering wheel and a steering column, a cross car beam supporting a first sliding surface, and an instrument panel assembly including an instrument cluster and a second sliding surface. The method comprises the steps of, upon said collision: displacing said steering assembly by moving said steering column forward in a controlled manner, and pushing said instrument cluster by said displacing steering assembly, such that said second sliding surface of said instrument panel assembly slides along the first surface for controlled deflection of the instrument cluster.

BRIEF DESCRIPTION OF THE DRAWINGS

The foregoing will be apparent from the following more particular description of the example embodiments, as illustrated in the accompanying figures in which like references characters refer to the same parts throughout the different views. The figures are not necessarily to scale, emphasis instead being placed upon illustrating the example embodiments through schematic figures.

DETAILED DESCRIPTION

Figure 1:
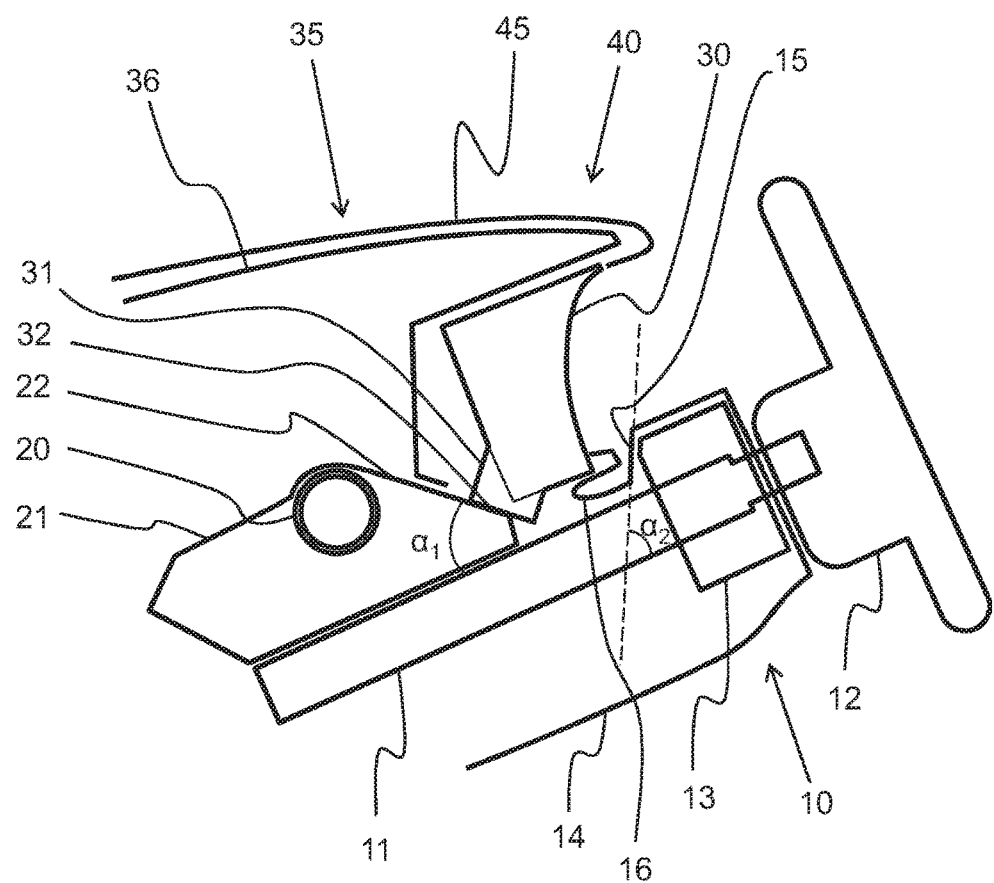
FIG. 1 shows a longitudinally cut schematic view of a collision control system prior to deflection.
Figure 2:
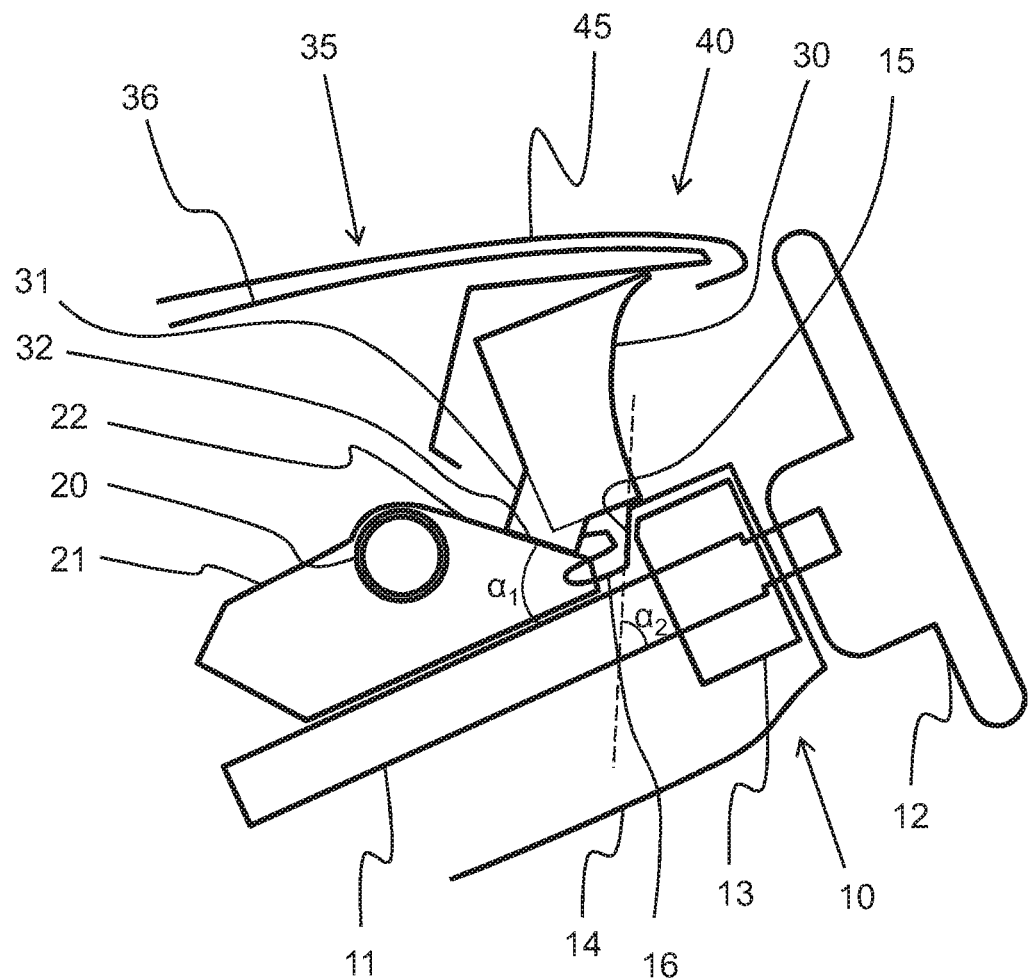
FIG. 2 shows a longitudinally cut schematic view of a collision control system subsequent to deflection.

FIGS. 1 and 2 show longitudinally cut schematic views of an example embodiment of a collision control system 40. The collision control system 40 is installed in the dashboard area 45 of a vehicle. The collision control system comprises a steering assembly 10, a cross car beam 20 and an instrument panel assembly 35.

FIG. 1 shows a schematic view of the collision control 40 before a collision type event has occurred.

The cross car beam 20 is fixed to a vehicle frame or chassis 50 and is a beam-like structure extending from one transverse side of the vehicle to the other. Many interior components of the vehicle are subsequently attached to the cross car beam 20. A cross car beam attachment 21 is attached to the cross car beam 20. The cross car beam attachment 21 can be part of a general cross car beam attachment, or a separate attachment specifically for the purpose of assembling the collision control system 40. The cross car beam attachment 21 may serve to provide support to the steering column 11, and/or providing support to the instrument panel assembly 35.

The steering assembly 10 comprises a steering column 11, a steering wheel 12, a steering column component unit 13 and a steering column cover 14. In the example embodiment shown in the figures, the steering column cover 14 partly covers the steering column 11 and steering column component unit 13. This serves to separate mechanical elements and electronics from the passenger compartment reducing risk of accidental damage to either. The steering column 11 extends through an opening in the steering column cover 14 and is attached to the steering wheel 12 at the other end of this opening. The steering assembly 10 also comprises a steering column boot 16, which is a flexible detail arranged to enclose the more flexible parts of the gap between the steering column cover 14 and the instrument cluster 30.

The steering column component unit 13 comprises electronics and mechanics for operating stalks and switches thereon and on the steering wheel for input by the driver to e.g. turn signals, windshield wipers and so on. The steering column component unit 13 also includes the horn coil and optionally knee absorption elements for reducing the impact on a driver's knees during collision.

On the steering assembly 10, a bearing surface 15 is formed as part of the steering column cover 14 and/or steering column component unit 13. The bearing surface 15 defines an angle $\alpha_2$ relative to the steering column 11. This angle $\alpha_2$ is approximately 60° degrees in the example embodiment shown in FIGS. 1 and 2. The specific angle $\alpha_2$ may depend on the dimensions of the surrounding structural elements. The angle $\alpha_2$ should preferably be between 10-80° degrees, specifically in the range of 30-75° degrees, and more specifically in the range of 45-70° degrees.

Additionally, the steering column component unit 13 is provided with a similar angled surface arranged on the interior of the bearing surface 15 which among other things allows the steering column component unit 13 to be housed interiorly of the angled bearing surface 15.

While not shown in the figures, the cross car beam attachment 21 also functions to fix the steering column 11 to the body of the vehicle via the cross car beam 20, thereby providing dual functionality of the cross car beam attachment 21. In particular, the steering column 11 may be clamped to the cross car beam 20 or cross car beam attachment 21 by means of threaded members or by means of welding.

In the example embodiment of FIG. 1 the cross car beam 20 comprises the first sliding surface 22, and more specifically, the cross car beam 20 comprises a cross car beam attachment 21, which is provided with and comprises the first sliding surface 22. By forming the first sliding surface directly on the cross car beam 20 or cross car beam attachment 21, such that the first sliding surface is integrally formed with the cross car beam 20 or cross car beam attachment 21, no additional component is required for providing the desired guidance ramp enabling controlled deflection of the instrument cluster 30. This solution thus simplifies assembly and reduces cost. Moreover, a high strength support structure underlying the first sliding surface 22 is also provided, thereby reducing the risk for collapse of the first sliding surface 22 during a crash event.

The first sliding surface 22 is substantially flat. Thereby mounting and correct positioning of the member carrying the second sliding surface 32 is simplified and cost-efficient. The first sliding surface faces in a direction upwardly and towards a rear of the vehicle for enabling the desired deflection of the instrument cluster 30.

The first sliding surface 22 extends towards a point above the cross car beam 20, such as to ensure that any object sliding along the first sliding surface does not collide with the cross car beam 20. This means that a plane defined by the first sliding surface 22 does not intersect with the cross car beam 20.

The first sliding surface defines an angle $\alpha_1$ relative to the steering column 11. This angle $\alpha_1$ is approximately 50° degrees in FIGS. 1 and 2. The specific angle $\alpha_1$ may depend on the dimensions of the surrounding structural elements. The angle $\alpha_1$ should preferably be between 10-80° degrees, specifically in the range of 20-60° degrees, and more specifically in the range of 30-55° degrees.

The cross car beam attachment 21 forms a ramp having a ramp surface with respect to the longitudinal direction of the steering column 11, wherein the first sliding surface 22 is provided on the ramp surface.

The instrument panel assembly 35 comprises an instrument cluster 30, an instrument panel substrate 36 and a second sliding surface 32, which second sliding surface 32 is arranged to abut and slide along the first sliding surface 22. The instrument cluster 30 is arranged above the steering assembly 10, inside the dashboard region 45. The instrument cluster 30 comprises electronics and meters for informing the driver of the vehicle regarding the status of the vehicle, such as e.g. the speedometer, fuel gauge, and status information display.

In the example embodiments shown in FIGS. 1 and 2, the second sliding surface 32 is arranged on an outside part of the instrument cluster. In these example embodiments, the instrument cluster 30 has an instrument cluster portion 31, which instrument cluster portion 31 comprises the second sliding surface 32. The instrument cluster portion 31 can be an integral part of the instrument cluster 30 or formed as a separate unit and assembled to the instrument cluster 30.

In FIG. 1, the instrument cluster 30 is arranged such that the second sliding surface 32 is abutting the first sliding surface 22 on the cross car beam attachment 21. However, it is also possible that the instrument cluster 30 is arranged at a short distance from the cross car beam attachment, and will abut only upon collision of the vehicle.

Upon the vehicle colliding with another object, the steering column 11 will move forward in a controlled manner, which will drive the components of the steering assembly 10 in an axial direction of the steering column 11 towards a point below the cross car beam. The forward motion of the steering column 11 is the result of a controlled axial collapse of the steering column 11 upon engagement from a compressive force. For example, the force may be about 2500 N, however this value may vary depending on many factors such as the steering column design.

As the steering column 11 moves forward in a controlled manner, the bearing surface 15 will start to press on the instrument cluster 30. Thereby, the instrument cluster 30 will be pressed in such a manner that it slides along the first sliding surface 22 by means of the second sliding surface 32. As the instrument cluster 30 is pressed sufficiently along the first sliding surface 22, the instrument cluster 30 will also have been sufficiently distanced from the steering column assembly 10, by travelling along the bearing surface 15, in the radial direction of the steering column that the instrument cluster 30 will have cleared the steering assembly 10.

The disclosure is not limited to a direct contact between the bearing surface 15 of the steering assembly 10 and the instrument cluster 30, but any part of the steering assembly 10 may be arranged to press any part of the instrument panel assembly 35 such that the instrument cluster 30 will be slidingly displaced from a normal position to a deflected position, depending on the design of the instrument panel assembly 35 and steering assembly 10.

Shown in FIG. 2 is the structural relationship of the components of the collision control system 40 after the steering column 11 has moved forward in a controlled manner. The instrument cluster 30 has been slid along the first sliding surface 22 as a result of being pressed by the bearing surface 15. The instrument cluster 30 has thus cleared the steering assembly 10 and is now essentially located above the steering assembly 10 in the radial direction of the steering column 11.

The instrument cluster 30 is arranged partially enclosed by a compartment of the instrument panel assembly 35. Part of the compartment of the instrument panel assembly 35 in which the instrument cluster 30 is arranged, such as a wall or roof thereof, is arranged to flex and/or hinge to accommodate the displacement of the instrument cluster 30. The instrument cluster 30 may push on said part of said compartment, or the instrument cluster 30 may be in rigid communication with the instrument panel assembly 35, which will thus push said part of said compartment to accommodate the displacement of the instrument cluster 30.

In the example embodiment shown in FIGS. 1 and 2, the compartment is formed as part of the instrument panel substrate 36, which will thus hinge/and or flex upon the instrument cluster 30 being displaced.

Figure 3:
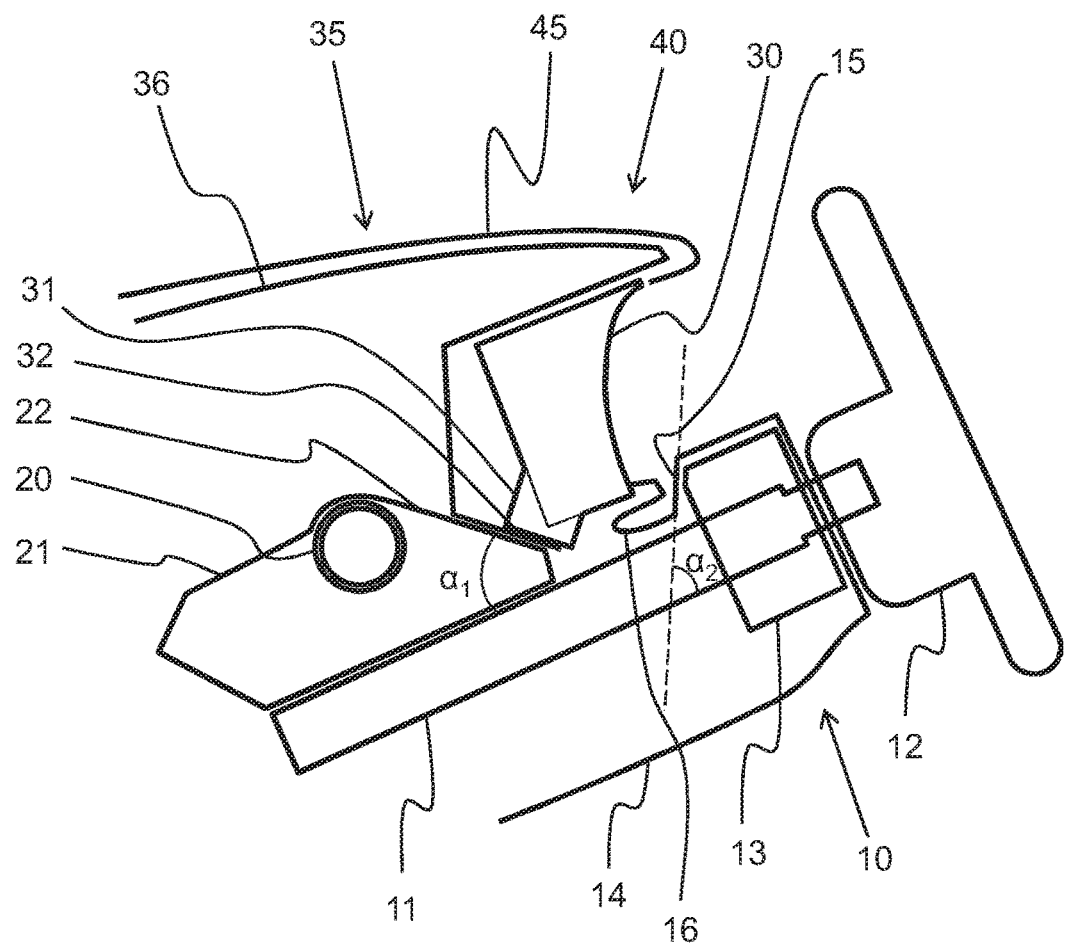
FIG. 3 shows a longitudinally cut schematic view of another example embodiment of the collision control system prior to deflection.
Figure 4:
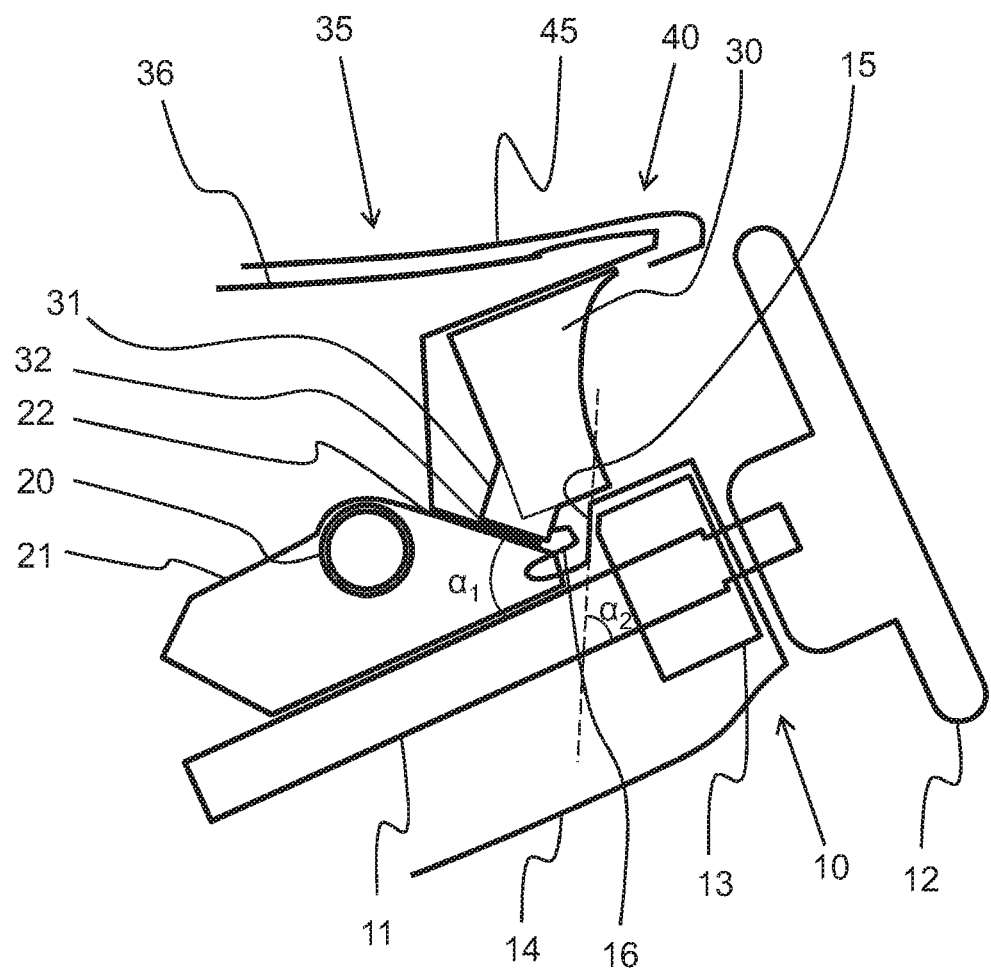
FIG. 4 shows a longitudinally cut schematic view of another example embodiment of the collision control system subsequent to deflection.

FIGS. 3 and 4 show another example embodiment of the collision control system 40.

In the example embodiment shown in FIGS. 3 and 4, the second sliding surface 32 is arranged on another part of the instrument panel assembly 35, in this case the instrument panel substrate 36. The instrument cluster 30 is embedded in or arranged on the instrument panel substrate 36. The instrument cluster 30 and instrument panel substrate 36 are arranged such that when the instrument cluster 30 is pushed, pushing movement will cause at least part of the instrument panel substrate 36 slide along the first sliding surface 22 by means of the second sliding surface 32. Thereby, both at least part of the instrument panel substrate 36 and the instrument cluster 30 will slide along the first sliding surface 22 by means of the second sliding surface 32.

In FIG. 3, the instrument cluster 30 is arranged such that the second sliding surface 32 is abutting the first sliding surface 22 on the cross car beam attachment 21. However, it is also possible that the instrument panel substrate 36 is arranged at a short distance from the cross car beam attachment 21, and will abut only upon collision of the vehicle.

In FIG. 4, the structural relationship of the example embodiment in FIG. 3 after the steering column 11 has moved forward in a controlled manner is shown. The instrument panel substrate 36 has been slid along the first sliding surface 22 as a result of the instrument cluster 30 being pressed by the bearing surface 15. The instrument cluster 30 has thus cleared the steering assembly 10 and is now essentially located above the steering assembly 10 in the radial direction of the steering column 11.

In the example embodiment shown in FIG. 4, the tip of the dashboard 45 and instrument panel substrate 36 are flexed and/or hinged away from the steering assembly 10 by the action of the instrument cluster 30 being displaced.

According to yet another example embodiment (not shown in the figures) the cross car beam 20 supports the instrument panel substrate 36, which comprises the first sliding surface 22. Thereby, the cross car beam 20 supports the first sliding surface 22. The instrument panel substrate 36 may for example be fastened to the cross car beam 20 or cross car beam attachment 21. In this case, the instrument cluster 30 comprises the second sliding surface 32, and the instrument cluster 30 moves along the first sliding surface 22 of the instrument panel substrate 36 when pressed by the bearing surface 15.

Figure 5:
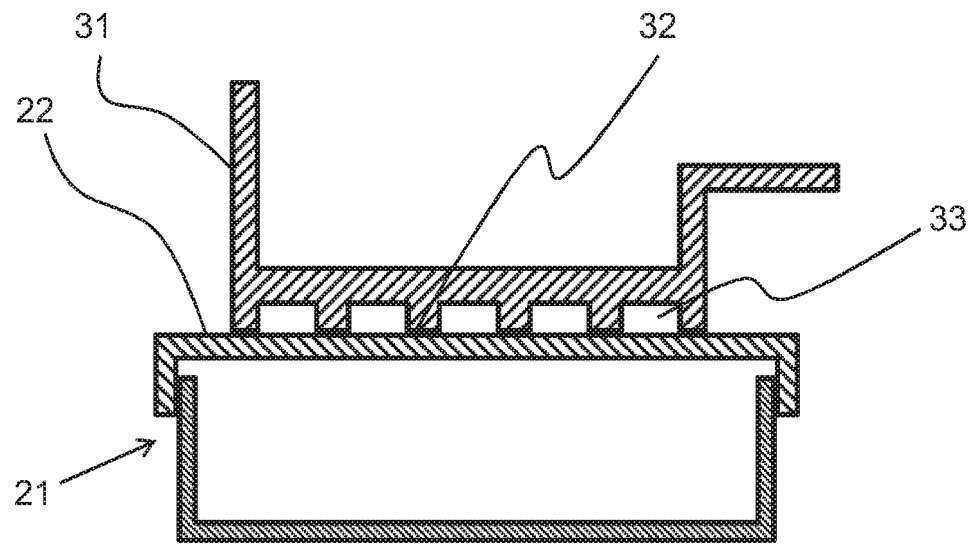
FIG. 5 shows a cut schematic view of the first and second sliding surfaces.

FIG. 5 shows a lateral cut view of the first and second sliding surfaces 22, 32. Shown in FIG. 5, the cross car beam attachment 21 comprises an upper and a lower part, where the first sliding surface 22 is located on the topside of the upper part. The instrument cluster 30 is provided with grooves 33 which extend along the sliding direction of the instrument cluster 30. The grooves 33 reduce the surface area contact between the first and second sliding surfaces 22, 32 which reduces friction during the sliding movement upon collision. The desired friction may differ between vehicle designs, and the size of the grooves and/or proportion thereof to the abutting parts of the second sliding surface 32 may be adjusted to achieve a suitable friction, by which the force required to displace the instrument cluster may be adjusted.

The desired in friction is achieved by longitudinal grooves 33 in the example embodiment shown in FIG. 5, but additional and/or alternative manners in which this can be achieved may be incorporated in the collision control system 40. The desired friction can for example also, or alternatively, come from the materials used for forming the first and second sliding surfaces 22, 32. Other structural designs of the sliding surfaces 22, 32 may be also be used.

Figure 6:
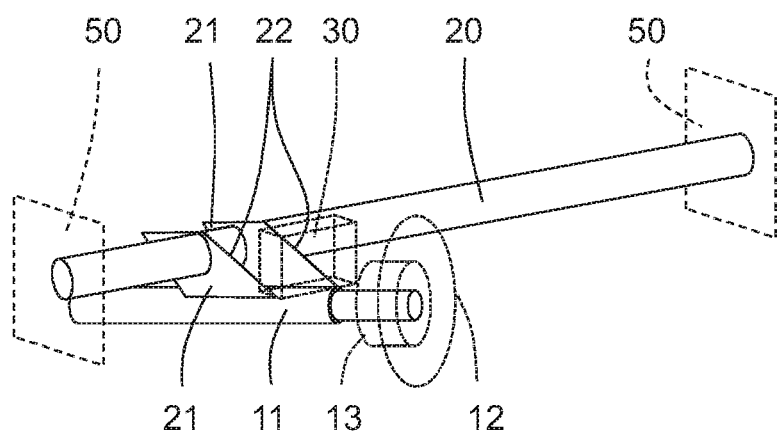
FIG. 6 shows a perspective view of the collision control system prior to deflection.

A perspective view of an example embodiment of the collision control system 40 is schematically illustrated in FIG. 6. The cross car beam 20 is fastened to the frame 50 of the vehicle at both transverse sides of the frame 50. The cross car beam 20 comprises a cross car beam attachment 21. A steering column 11 is disclosed permanently fastened to the cross car beam 20 via the cross car beam attachment 21. A steering wheel 12 and steering column component unit 13 are schematically illustrated in front of the instrument cluster 30 that is located in the normal position.

The cross car beam attachment 21 according to the disclosed example embodiment comprises two transversally offset cross car beam attachment members. Both cross car beam attachment members have similar geometry and size and each member comprises a first sliding surface 22. Many alternative designs of the cross car beam 20 and/or cross car beam attachment 21 are however possible and the illustrated design of the two cross car beam attachment members is merely one example out of many, which may be selected according to the specific circumstances. For example, there may be only a single member having a single first sliding surface 22, or the two members are interconnected by a plate that forms a single first sliding surface 22.

The present invention may be embodied in other specific forms without departing from its spirit or essential characteristics. It is appreciated that various features of the above-described examples can be mixed and matched to form a variety of other alternatives. As such, the described embodiments are to be considered in all respects only as illustrative and not restrictive. The scope of the invention is, therefore, indicated by the appended claims rather than by the foregoing description. All changes that come within the meaning and range of equivalency of the claims are to be included within their scope.

The order of embodiments has no particular meaning and has nothing to do with the importance of the embodiments.

REFERENCE LIST

10 Steering assembly
11 Steering column
12 Steering wheel
13 Steering column component unit
14 Steering column cover
15 Bearing surface
16 Steering column boot
20 Cross car beam
21 Cross car beam attachment
22 First sliding surface
30 Instrument cluster
31 Instrument cluster portion
32 Second sliding surface
33 Groove
35 Instrument panel assembly
36 Instrument panel substrate
40 Collision control system
45 Dashboard
50 Vehicle frame
$\alpha_1$ First sliding surface angle
$\alpha_2$ Bearing surface angle

What is claimed is:

1. Collision control system for controlling deflection of an instrument cluster in a vehicle during collision, wherein said collision control system comprises:
   a steering assembly including a steering wheel and a steering column;
   a cross car beam comprising a first sliding surface; and
   an instrument panel assembly including the instrument cluster and a second sliding surface, which is arranged to abut and slide along said first sliding surface during said collision,
   wherein during collision said steering column is configured to move forward in a controlled manner and said steering assembly is arranged to push said instrument cluster, such that said second sliding surface of said instrument panel assembly slides along the first sliding surface for controlled deflection of the instrument cluster.

2. Collision control system according to claim 1, wherein said instrument cluster comprises said second sliding surface or wherein said instrument panel assembly comprises an instrument panel substrate that comprises said second sliding surface.

3. Collision control system according to claim 2, wherein said first sliding surface of said cross car beam is located on a cross car beam attachment located on said cross car beam.

4. Collision control system according to claim 1, wherein an extension direction of said first sliding surface defines an angle (al) relative to a direction of axial extension of the steering column, and wherein said angle (al) is in the range of 10-80° degrees.

5. Collision control system according to claim 1, wherein said steering assembly comprises a steering assembly attachment arranged at said steering column, wherein said steering assembly attachment comprises a bearing surface, wherein said steering assembly is arranged to push said instrument cluster by said bearing surface during said collision, wherein an extension direction of said bearing surface defines an angle relative to a direction of axial extension of the steering column, and wherein said angle is in the range of 10-80° degrees.

6. Collision control system according to claim 1, wherein at least one of the first and second sliding surfaces is equipped with at least one groove along at least part of the extension of the first or second sliding surface, which at least one groove extends in an intended sliding direction of said second sliding surface along said first sliding surface.

7. Collision control system according to claim 1, wherein the first and second sliding surfaces are configured for deflecting the instrument cluster in a direction towards a point above the cross car beam.

8. Collision control system according to claim 1, wherein the first sliding surface is substantially flat.

9. Collision control system according to claim 1, wherein the collision control system is configured such that the force needed to displace said instrument cluster 50 mm along said first sliding surface is below 500 N.

10. Collision control system according to claim 1, wherein at least one of the first or second sliding surfaces comprises two transversally spaced sliding surface parts.

11. Collision control system according to claim 1, wherein the first and second sliding surfaces are arranged to abut during normal operation of the vehicle.

12. Collision control system according to claim 1, wherein the cross car beam has a beam-like structure that is arranged to extend from one transverse side of the vehicle to the other, and wherein the cross car beam is arranged to be fixed to a vehicle frame.

13. Collision control system according to claim 1, wherein the steering column is fastened and supported by the cross car beam or a cross car beam attachment.

14. Vehicle comprising a collision control system according to claim 1.

15. Collision control system according to claim 4, wherein said angle (al) is in the range of 20-60° degrees.

16. Collision control system according to claim 4, wherein said angle (al) is in the range of 30-55° degrees.

17. Collision control system according to claim 5, wherein said angle is in the range of 30-75° degrees.

18. Collision control system according to claim 5, wherein said angle is in the range of 45-70° degrees.

19. Collision control system according to claim 9, wherein the collision control system is configured such that the force needed to displace said instrument cluster 50 mm along said first sliding surface is below 300 N.

* * * * *